(12) United States Patent
Li (10) Patent No.: US 11,363,353 B2
(45) Date of Patent: Jun. 14, 2022

(54) VIDEO HIGHLIGHT DETERMINATION METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Zhongwei Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/802,318

(22) Filed: Feb. 26, 2020

(65) Prior Publication Data
US 2020/0213686 A1 Jul. 2, 2020

Related U.S. Application Data

(63) Continuation of application No. PCT/CN2018/106262, filed on Sep. 18, 2018.

(30) Foreign Application Priority Data

Sep. 21, 2017 (CN) .......................... 201710862009.7

(51) Int. Cl.
*H04N 21/8549* (2011.01)
*H04N 21/432* (2011.01)
(Continued)

(52) U.S. Cl.
CPC ......... *H04N 21/8549* (2013.01); *G06V 20/46* (2022.01); *G06V 20/49* (2022.01);
(Continued)

(58) Field of Classification Search
CPC ........... H04N 21/8549; H04N 21/4325; H04N 21/435; H04N 21/44; H04N 21/44222;
(Continued)

(56) References Cited

U.S. PATENT DOCUMENTS 8,566,866 B1 * 10/2013 Fleischman ...... H04N 21/44222
725/34
9,253,533 B1 * 2/2016 Morgan ............. H04N 21/4325
(Continued)

FOREIGN PATENT DOCUMENTS

CN 103957433 A 7/2014
CN 104994425 A 10/2015
(Continued)

OTHER PUBLICATIONS

T. M. Liu, H. J. Zhang and F. H. Qi, "A novel video key frame extraction algorithm," 2002 IEEE International Symposium on Circuits and Systems. Proceedings (Cat. No.02CH37353), 2002, pp. IV-IV, doi: 10.1109/ISCAS.2002.1010411. (Year: 2002).*
(Continued)

*Primary Examiner* — Cynthia M Fogg
(74) *Attorney, Agent, or Firm* — Anova Law Group, PLLC (57) ABSTRACT

Embodiments of this application disclose a video highlight determination method. The method includes: obtaining operation records of a target video, each operation record indicating a first play moment and an operation performed on the target video at the first play moment, and the first play moment being a play moment of the target video; obtaining, from the operation records, a quantity of operations of a target type that are performed on the target video at each play moment of the target video; and determining a target segment in the target video according to the quantity of operations. A ratio of a total quantity of operations of the target type performed on the target segment to a duration of the target segment is greater than a ratio of a total quantity of operations of the target type performed on the target video to a duration of the target video.

17 Claims, 5 Drawing Sheets

(51) Int. Cl.
  *H04N 21/435* (2011.01)
  *H04N 21/44* (2011.01)
  *H04N 21/845* (2011.01)
  *H04N 21/442* (2011.01)
  *G06V 20/40* (2022.01)
(52) U.S. Cl.
  CPC ....... *H04N 21/435* (2013.01); *H04N 21/4325* (2013.01); *H04N 21/44* (2013.01); *H04N 21/44224* (2020.08); *H04N 21/8456* (2013.01)
(58) Field of Classification Search
  CPC ......... H04N 21/8456; H04N 21/26603; H04N 21/84; H04N 21/6582; H04N 21/266; H04N 21/47205; H04N 21/47214; G06K 9/00744; G06K 9/00765
  USPC .......................................................... 725/14
  See application file for complete search history.

(56) References Cited

U.S. PATENT DOCUMENTS

| | | | | |
|---|---|---|---|---|
| 9,740,984 | B2* | 8/2017 | Lucey | G06N 5/043 |
| 10,681,391 | B2* | 6/2020 | Ni | G11B 27/28 |
| 2004/0197088 | A1* | 10/2004 | Ferman | H04N 21/426 |
| | | | | 386/251 |
| 2006/0252536 | A1* | 11/2006 | Shiu | H04N 21/44008 |
| | | | | 463/36 |
| 2012/0237183 | A1* | 9/2012 | Chen | H04N 7/17318 |
| | | | | 386/241 |
| 2012/0324491 | A1* | 12/2012 | Bathiche | H04N 21/42202 |
| | | | | 725/10 |
| 2014/0068692 | A1* | 3/2014 | Archibong | H04N 21/23424 |
| | | | | 725/116 |
| 2014/0337126 | A1* | 11/2014 | Ohanyan | G06Q 30/0251 |
| | | | | 705/14.49 |
| 2015/0154452 | A1* | 6/2015 | Bentley | G11B 27/031 |
| | | | | 386/201 |
| 2016/0105734 | A1* | 4/2016 | Packard | H04N 21/231 |
| | | | | 725/32 |
| 2017/0257410 | A1* | 9/2017 | Gattis | H04N 21/8455 |
| 2021/0120319 | A1* | 4/2021 | Zhou | H04N 21/4882 |

FOREIGN PATENT DOCUMENTS

| | | |
|---|---|---|
| CN | 105939494 A | 9/2016 |
| CN | 106170104 A | 11/2016 |
| CN | 107105318 A | 8/2017 |

OTHER PUBLICATIONS

S. G. Quadri, S. Krishnan and L. Guan, "Indexing of NFL video using MPEG-7 descriptors and MFCC features," Proceedings. (ICASSP '05). IEEE International Conference on Acoustics, Speech, and Signal Processing, 2005., 2005, pp. ii/429-ii/432 vol. 2, doi: 10.1109/ICASSP.2005.1415433. (Year: 2005).*

Bettadapura et al., Leveraging Contextual Cues for Generating Basketball Highlights, Jun. 29, 2016, Proceedings of ACM Multimedia 2016, http://www.vbettadapura.com/highlights/basketball/ (Year: 2016).*

The World Intellectual Property Organization (WIPO) International Search Report for PCT/CN2018/106262 dated Nov. 28, 2018 5 Pages (including translation).

* cited by examiner

VIDEO HIGHLIGHT DETERMINATION METHOD AND APPARATUS, STORAGE MEDIUM, AND ELECTRONIC DEVICE

CROSS-REFERENCES TO RELATED APPLICATIONS

This application claims priority to PCT Application No. PCT/CN2018/106262, filed on Sep. 18, 2018, which claims priority to Chinese Patent Application No. 201710862009.7, filed with the Chinese Patent Office on Sep. 21, 2017 and entitled "VIDEO HIGHLIGHT DETERMINATION METHOD AND APPARATUS," which are both incorporated by reference in their entirety.

FIELD OF THE TECHNOLOGY

This application relates to technologies used on the Internet, and specifically, to a video highlight determining method and apparatus, a storage medium, and an electronic device.

BACKGROUND OF THE DISCLOSURE

OTT, short for "Over The Top," refers to providing application services to users through the Internet. Such application is different from current communication services provided by operators. According to the OTT, a network of an operator is used, but the service may be provided by a third party that is not an operator.

Among video services, it is a very important service to annotate a highlight segment in a video. In the related art, the video is manually annotated as described below.

Step 11. A video editor first watches video content in full after receiving the video content.

Step 12. The editor determines, according to personal experience, which video segment may cause a hot topic (that is, determines a desired video segment), and manually annotates at a location (a corresponding video duration location) of the segment.

Step 13. The editor manually enters information about the annotated hotspot location into a video media system. The system may provide a service of reading a corresponding hotspot location according to a video ID (VID).

Step 14. Display annotation information according to a service scenario requirement when the video is played.

The foregoing video annotation has the following problems:

(1) Dependence on manual annotation leads to heavy workload, high costs, and low efficiency.

(2) Judgment on a degree of excitement or a possibility of creating a trend by a video segment depends entirely on personal experience, which requires a high personal ability of the editor. Therefore, a clipped video segment may not match actual interests of the users.

(3) Manual annotation tends to be a one-time job. For labor, cost, and other reasons, annotation basically remains unchanged once completed, making it difficult to adapt to a dynamic process of hotspot changing in a video play process.

Currently, no effective solution has been proposed to resolve the technical problem of low efficiency in determining a desired video segment in a video in the related art.

SUMMARY

Embodiments of this application provide a video highlight determination method and apparatus, a storage medium, and an electronic device, to resolve at least a technical problem of low efficiency in determining a desired video segment in a video in the related art.

According to one aspect of the embodiments of this application, a video highlight determination method is provided. The method includes: obtaining operation records of a target video from instances of the target video, each operation record indicating a first play moment and an operation performed on the target video at the first play moment, and the first play moment being a play moment of the target video; obtaining, from the operation records, a quantity of operations of a target type performed on the target video at each play moment of the target video; determining a target segment in the target video according to the quantity, a ratio of a total quantity of operations of the target type that are performed on the target video at play moments within the target segment to a duration of the target segment being at least greater than a ratio of a total quantity of operations of the target type that are performed on the target video to a duration of the target video; and identifying, a first play moment of a key frame closest to the start play moment of the target segment as a start play moment of the target segment and a second play moment of a key frame closest to the end play moment of the target segment as an end play moment of the target segment.

According to another aspect of the embodiments of this application, a video highlight determination apparatus is further provided. The apparatus includes a first obtaining unit, configured to obtain operation records of a target video, each operation record indicating a first play moment and an operation performed on the target video at the first play moment, and the first play moment being a play moment of the target video; a second obtaining unit, configured to obtain, from the operation records, a quantity of operations of a target type that are performed on the target video at each play moment of the target video; and a determining unit, configured to determine a target segment in the target video according to the quantity, a ratio of a total quantity of operations of the target type that are performed on the target video during the target segment to a duration of the target segment being at least greater than a ratio of a total quantity of operations of the target type that are performed on the target video to a duration of the target video.

According to another aspect of the embodiments of this application, a computer readable storage medium is provided. The computer readable storing a program, the program, when executed by one or more processors, performs a method comprising: obtaining operation records of a target video from instances of the target video, each operation record indicating a first play moment and an operation performed on the target video at the first play moment, and the first play moment being a play moment of the target video; obtaining, from the operation records, a quantity of operations of a target type performed on the target video at each play moment of the target video; and determining a target segment in the target video according to the quantity, a ratio of a total quantity of operations of the target type being performed on the target segment to a duration of the target segment being greater than or equal to a ratio of a total quantity of operations of the target type being performed on the target video to a duration of the target video.

In the embodiments of this application, a quantity of operations of a target type that are performed on a target video at each play moment of the target video is obtained from obtained operation records; and a target segment is determined in the target video according to a principle of a ratio of a total quantity of operations of the target type that are performed on the target video during the target segment to a duration of the target segment being at least greater than a ratio of a total quantity of operations of the target type that are performed on the target video to a duration of the target video. The embodiments of this application can resolve a technical problem of low efficiency in determining a video segment in a video in the related art, and improve the efficiency in determining a target segment in a target video.

BRIEF DESCRIPTION OF THE DRAWINGS

The accompanying drawings described herein are used for providing a further understanding of this application and form a part of this application. Exemplary embodiments of this application and descriptions thereof are used for explaining the embodiments of this application, and do not constitute any inappropriate limitation on the embodiments of this application. In the accompanying drawings.

DESCRIPTION OF EMBODIMENTS

To make a person skilled in the art understand solutions of the embodiments of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of the embodiments of this application.

In the specification, claims, and accompanying drawings of this application, the terms "first," "second," and so on are intended to distinguish between similar objects but do not necessarily indicate a specific order or sequence. The data termed in such a way are interchangeable in proper circumstances, so that the embodiments of this application described herein can be implemented in orders except the order illustrated or described herein. In addition, terms "include" and "have" and any of their variations are intended to cover nonexclusive including, for example, a process, method, system, product, or device that includes a series of steps or units do not have to be limited to those clearly listed steps or units, but may include another step or unit that is not clearly listed or is inherent to such a process, method, product, or device.

According to one aspect of the embodiments of this application, a method embodiment of a video highlight determination method is provided.

Figure 1:
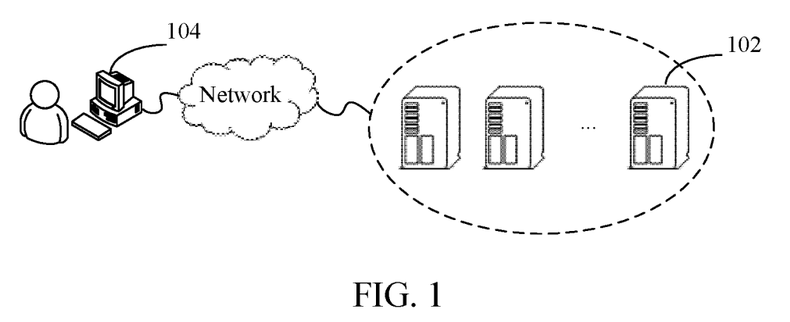
FIG. 1 is a schematic diagram of a hardware environment of a video highlight determination method according to an embodiment of this application.

In this embodiment, the video highlight determination method may be applied to a hardware environment including a server 102 and a terminal 104 shown in FIG. 1. As shown in FIG. 1, the server 102 is connected to the terminal 104 through a network. The network includes, but is not limited to, a wide area network, a metropolitan area network, or a local area network. The terminal 104 is not limited to a PC, a mobile phone, a tablet computer, and the like. The video highlight determination method in this embodiment may be performed by the server 102, or may be jointly performed by the server 102 and the terminal 104. When the terminal 104 performs the video highlight determination method in this embodiment of this application, the method may be specifically performed by a client installed on the terminal 104.

When the video highlight determination method in this embodiment is separately performed by the server, the server may directly execute program code corresponding to the method in this embodiment of this application.

When the video highlight determination method in this embodiment is jointly performed by the server and the terminal, the terminal sends operation records to the server, and the server executes program code corresponding to the method in this embodiment of this application, and feeds back a processing result to the terminal.

Figure 2:
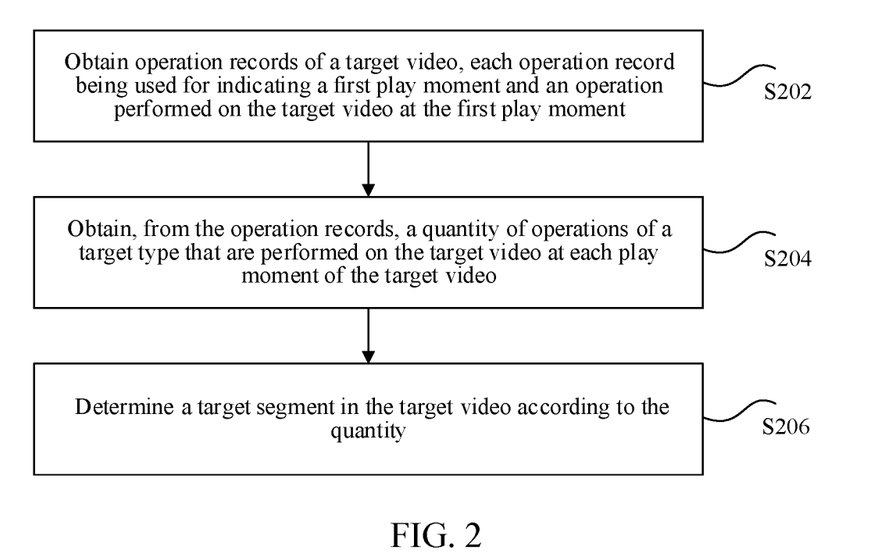
FIG. 2 is a flowchart of an optional video highlight determination method according to an embodiment of this application.

This embodiment of this application is described below in detail by using an example that the server executes the program code corresponding to the method in this embodiment of this application. FIG. 2 is a flowchart of an optional video highlight determination method according to an embodiment of this application. As shown in FIG. 2, the method may include the following steps:

Step S202. A server obtains operation records of a target video, each operation record being used for indicating a first play moment and an operation performed on the target video at the first play moment, and the first play moment being a play moment of the target video. In one embodiment, the server obtains operations records from multiple instances of the target video. Each instance of the target video may have been played on a different website or a different terminal.

The operation record may include two information parts. One is an operation action (for example, posting a bullet comment, a chat operation, participating in interaction, skipping during watching, or taking a video screenshot). The other is related information (namely, streaming information, including information such as a user ID, a play moment of the video during operation, an operation type, and operation content) of the operation action. At least the play moment of the video during operation and the operation type are included.

Step S204. The server obtains, from the operation records, a quantity of operations of a target type that are performed on the target video at each play moment of the target video.

An operation of the target type may be determined according to a type of a target segment needing to be determined. For example, if the target segment needing to be determined is a hotspot video segment, the operation of the target type is a hotspot-related operation, such as posting a bullet comment, a chat operation, participating in interaction, or taking a video screenshot. For another example, if the target segment needing to be determined is a completely played segment, the operation of the target type is a complete-playrelated operation, such as a fast forward operation, a rewind operation, or a drag operation on a play progress bar. Alternatively, the target segment needing to be determined may be a highlight segment, a key segment, or the like.

Step S206. The server determines a target segment in the target video according to the quantity, a ratio of a total quantity of operations of the target type that are performed on the target video during the target segment to a duration of the target segment being at least greater than a ratio of a total quantity of operations of the target type that are performed on the target video to a duration of the target video.

In the foregoing steps, big data analysis may be performed on corresponding user behavior (namely, operations indicated in the operation records) according to a need (namely, a type of the target segment), to obtain behavior data (namely, a quantity of performed operations) of users at each play moment of the entire target video, to determine a desired target segment (namely, a coherent video segment receiving relatively dense operations) according to the behavior data of the users.

By performing step S202 to step S206, a server obtains, from obtained operation records, a quantity of operations of a target type that are performed on a target video at each play moment of the target video; and the server determines a desired target segment in the target video according to a principle of a ratio of a total quantity of operations of the target type that are performed on the target video during the target segment to a duration of the target segment being at least greater than a ratio of a total quantity of operations of the target type that are performed on the target video to a duration of the target video. This embodiment of this application can resolve a technical problem of low efficiency in determining a desired video segment in a video in the related art, and improve the efficiency in determining a desired target segment in a target video.

This embodiment of this application is further described below in detail with reference to step S202 to step S206 from a technical side.

When the operation records of the target video are obtained, the technical solution provided in step S202 includes but is not limited to the following two obtaining methods.

First method: The server periodically reads prestored operation records. When a terminal plays the target video, the server stores an operation record sent by the terminal in real time into a database. When obtaining the operation records of the target video, the server reads operation records of the target video within a specific period from the database according to a VID of the target video, to obtain a target segment (for example, a hotspot video segment) through statistical analysis. The server may periodically collect statistics for the target segment (that is, the step of obtaining operation records of a target video is periodically triggered), to periodically update the hotspot video segment.

Second method: The server obtains, in real time, an operation record uploaded by a terminal. The server receives, in real time, the operation record fed back by the terminal, and performs real-time calculation on the operation record, to determine a hotspot video segment within a current period.

In the technical solution provided in step S204, the quantity of the operations of the target type that are performed on the target video at each play moment of the target video is obtained from the operation records.

Different operation record obtaining methods correspond to different meanings of "obtaining, from operation records, a quantity of operations of a target type that are performed on the target video at each play moment of the target video." When the method in this embodiment is specifically practiced, a selection may be performed according to a requirement.

In the first method of periodically reading prestored operation records (for example, reading operation records within a specific period before a current moment), a calculated quantity represents a feature (for example, whether a hotspot is present) within the previous period.

In the second method of obtaining, in real time, an operation record uploaded by a terminal, a feature (for example, whether a hotspot is present) at a current moment is calculated in real time.

Figure 9:
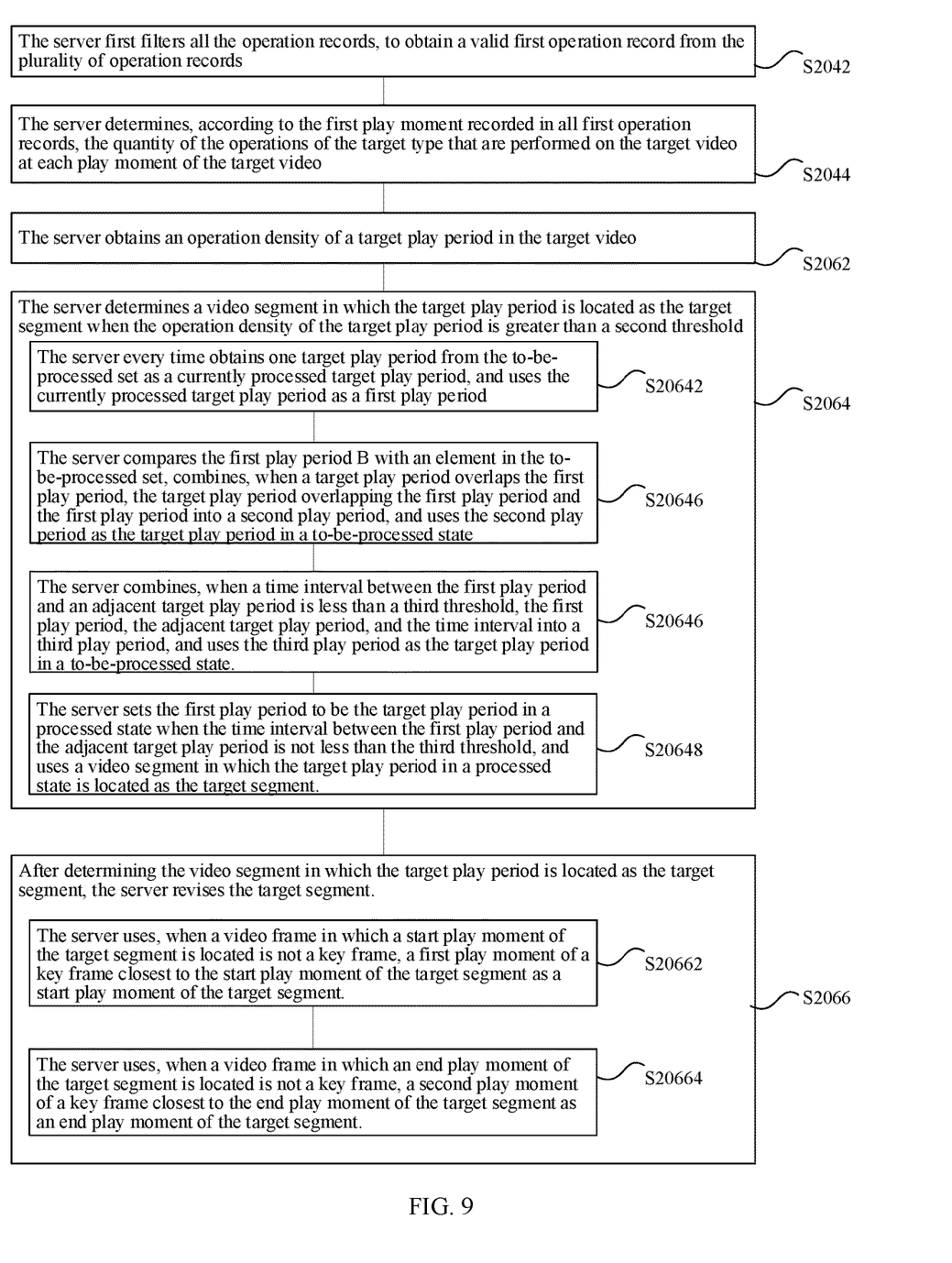
FIG. 9 is a flowchart of a video highlight determination method according to an embodiment of this application.

With reference to FIG. 9, the details related to how to obtain, from the operation records, the quantity of the operations of the target type that are performed on the target video at each play moment of the target video, this embodiment of this application provides the following obtaining method.

Step S2042. The server first filters all the operation records, to obtain a valid first operation record from the plurality of operation records, where the first operation record is used for indicating an operation of the target type that is performed on the target video at the first play moment.

In some embodiments, the server may perform step S2042 and step S2044 in a single-threaded or multi-threaded manner. When obtaining the first operation record from the plurality of operation records in step S2042, the server performs the following operations on each thread: obtaining one of the plurality of operation records; and using the obtained operation record as the first operation record when an operation identifier recorded in the obtained operation record is used for indicating an operation (such as posting a bullet comment, a chat operation, participating in interaction, or taking a video screenshot) of the target type.

Step S2044. The server determines, according to the first play moment recorded in all first operation records, the quantity of the operations of the target type that are performed on the target video at each play moment of the target video.

In some embodiments, the server may first initialize the quantity of the operations of the target type that are performed on the target video at each play moment of the target video, that is, set the quantity to 0; then obtain each first operation record one by one (or when a first operation record is filtered out in step S2042), read a play moment (that is, the first play moment) recorded in the first operation record, and increase a quantity corresponding to the play moment by 1; and repeat the operation until statistics on all the first operation records are collected, to obtain the quantity of the operations of the target type at each play moment of the target video.

In the technical solution provided in step S206, the server determines the target segment in the target video according to the quantity, the ratio of the total quantity of the operations of the target type that are performed on the target video at the play moments within the target segment to the duration of the target segment being at least greater than the ratio of the total quantity of the operations of the target type that are performed on the target video to the duration of the target video. An embodiment of step S206 may be implemented by performing the following steps:

Step S2062. The server obtains an operation density of a target play period in the target video, where the target play period is any play period that is in the target video and whose play duration is a first threshold, and the operation density is a ratio of a total quantity of operations of the target type that are performed within the target play period to the first threshold.

When the operation density of the target play period in the target video is obtained, the target play period may have a fixed value (that is, the first threshold, such as 1 second, 5 seconds, 10 seconds, or 1 minute). When the target play period is initially obtained, the target play period may be obtained according to a particular time interval (for example, start play moments of two adjacent target play periods are spaced by a time unit, such as 1 second or 1 minute). That is, a plurality of target play periods are obtained. Then operation densities of the plurality of target play periods in the target video are calculated.

Figure 3:
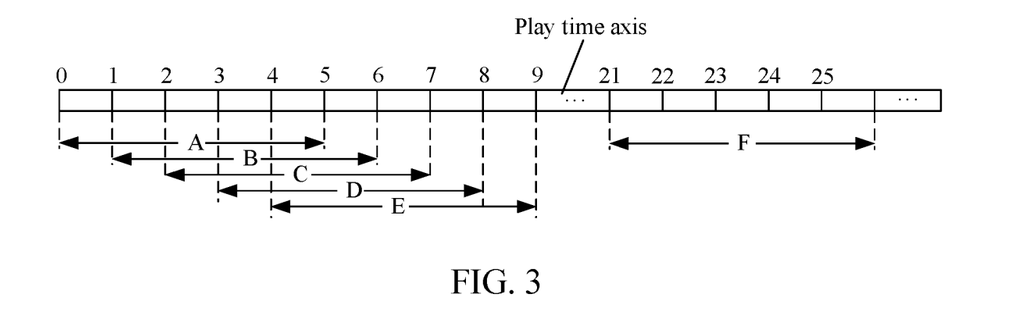
FIG. 3 is a schematic diagram of a video play time axis according to an embodiment of this application.

FIG. 3 shows a play time axis. For example, the first threshold includes 5 time units (for example, the unit is 1 second, 10 seconds, or 1 minute). The first target play period A corresponds to play moments 0 to 5, the second target play period B corresponds to play moments 1 to 6, the third target play period C corresponds to play moments 2 to 7, and so on, to determine the target play periods.

After the target play periods are determined, a total quantity of operations during each target play period is counted, and a ratio (that is, an operation density) of the total quantity to the first threshold is calculated.

Step S2064. The server determines a video segment in which the target play period is located as the target segment when the operation density of the target play period is greater than a second threshold, where the second threshold is greater than or equal to the ratio of the total quantity of the operations of the target type that are performed on the target video to the duration of the target video.

In some embodiments, the "determining a video segment in which the target play period is located as the target segment when the operation density of the target play period is greater than a second threshold" may include meanings in two aspects. In one aspect, a video segment whose start play moment is a start play moment of the target play period, and whose end play moment is an end play moment of the target play period is directly the target segment. In the other aspect, the target segment includes at least the video segment in which the target play period is located. The latter is described below in detail.

The determining a video segment in which the target play period is located as the target segment when the operation density of the target play period is greater than a second threshold includes: setting, when there are a plurality of target play periods, all target play periods (for example, the periods A, B, C, D, and F shown in FIG. 3) whose operation densities are greater than the second threshold in a to-be-processed state, and storing the target play periods into a to-be-processed set (all target play periods in step S20642 to step S20648 are play periods whose operation densities are greater than the second threshold); and performing the following operations on the target play periods until all the target play periods are in a processed state:

Step S20642. The server every time obtains one target play period from the to-be-processed set as a currently processed target play period, and uses the currently processed target play period as a first play period, for example, uses the obtained target play period B as a first play period.

Step S20644. The server compares the first play period B with an element (such as the periods A, C, D, and F) in the to-be-processed set, combines, when a target play period overlaps the first play period, the target play period overlapping the first play period and the first play period into a second play period, and uses the second play period as the target play period in a to-be-processed state. For example, the period A overlaps the period B, the period A and the period B are combined, and a combined period corresponds to the play moments 0 to 6.

If a next obtained first play period is the combined target play period (corresponding to the play moments 0 to 6), it is further determined whether a target play period overlaps the combined target play period. It can be seen that the combined target play period overlaps the period C. Therefore, the combined target play period and the period C are combined. As a combined target play period overlaps the period D, combination is continued, to obtain a target play period G (corresponding to the play moments 0 to 8).

Step S20646. The server combines, when a time interval between the first play period and an adjacent target play period is less than a third threshold, the first play period, the adjacent target play period, and the time interval into a third play period, and uses the third play period as the target play period in a to-be-processed state.

The third threshold may be set according to an actual need, for example, set to 5 time units.

As a time interval between the period G and a period F (an interval between an end play moment of the period G and a start play moment of the period F) is not less than the third threshold 5, the period G and the period F are not combined.

Step S20648. The server sets the first play period to be the target play period in a processed state when the time interval between the first play period and the adjacent target play period is not less than the third threshold, and uses a video segment in which the target play period in a processed state is located as the target segment.

As the time interval between the period G and a period F that are adjacent is not less than the third threshold 5, the period G may be set to be the target play period in a processed state, and a video segment in which the period G is located may be used as the target segment.

Step S2066. After determining the video segment in which the target play period is located as the target segment, the server may revise the target segment as described below.

Step S20662. The server uses, when a video frame in which a start play moment of the target segment is located is not a key frame, a first play moment of a key frame closest to the start play moment of the target segment as a start play moment of the target segment.

The key frame is a frame in which a key action when a character or an object moves or changes is located.

Step S20664. The server uses, when a video frame in which an end play moment of the target segment is located is not a key frame, a second play moment of a key frame closest to the end play moment of the target segment as an end play moment of the target segment.

In some embodiments, the first play moment is earlier than the start play moment of the target segment before the revision; and the second play moment is later than the end play moment of the target segment before the revision.

The method provided in step S202 to step S206 of this embodiment of this application may be applied to service scenarios such as video tidbits and hotspot operation, for example, applied to hotspot video annotation in hotspot operation. A highlight segment may be automatically annotated and clipped based on big data mining. In the solution, by collecting behavior data of active behavior of users watching a video, such as posting a bullet comment, skipping during watching, and taking a video screenshot, a hotspot part of the video is automatically discovered and annotated by using data statistics, mining, and other technologies, and an highlight segment is then clipped according to hotspot distribution.

Figure 4:
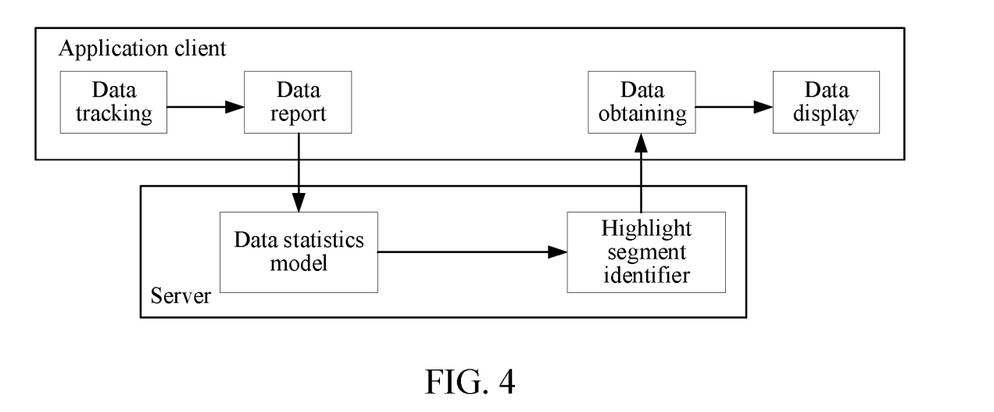
FIG. 4 is a schematic diagram of video annotation according to an embodiment of this application.

In an optional embodiment, the following uses hotspot video annotation shown in FIG. 4 as an example for detailed description:

Determine, on a product, which use behavior (that is, operations of a target type) (for example, behavior such as posting a bullet comment, skipping during watching, and taking a video screenshot) of users is related to a degree of excitement of video content. For the behavior, a specification (including a user ID, an operation time, a VID, a watching node, a behavior type, and the like) of a behavior report operation record is designed in advance. Moreover, data is tracked, and the data is reported in a scenario and timing corresponding to an application client.

An application reports operation record data. The application ensures, according to a product report specification requirement, that the data is completely reported to a data storage platform database of a back end server as agreed.

After collecting user behavior data, the back end server calculates, based on common behavior operations of a massive number of users and through data modeling or rule statistics, related identification information of a highlight segment of each video by using a data statistics model. After obtaining the related identification information, the back end server may directly clip a related sub segment or take a screenshot for sharing and propagation; or may synchronize the related information to a client player for hotspot identification, fast skip, and the like in a play scenario of the application.

The server may provide, through an online service, a highlight segment identifier obtained by the client to the front end application for invocation. The front end application may obtain related highlight segment identification information by using the VID.

For example, the server transmits instruction information to a terminal when the terminal plays a target video, where the instruction information is used for instructing the terminal to identify a target segment, and display an identifier or annotation content; or transmit the instruction information to the terminal in response to a received request to play the target video.

After the front end obtains the identification information, and a user clicks and starts a player in a video play scenario, the front end may present identification and tracking information of a highlight segment at a play progress bar. During interaction, a user may fast skip to a play location of the highlight segment, to immediately watch exciting content as the user requires.

In the solution, the server automatically performs clipping, which replaces manual processing in the related art. When receiving a content medium to be put online, a video editor does not need to annotate or record a video hotspot segment, but only completes video review and release. After content release, a video play terminal (for example, a video client such as an Android mobile phone, an iPhone mobile phone, a PC, a WEB, or a TV) identifies, extracts, and reports streaming information (including information fields such as a user ID, an operation time, an operation type, and operation content) of a video watching action (such as posting a bullet comment, participating in interaction, skipping during watching, or taking a video screenshot) of a user. After receiving the reported information (operation records), the back end imports the information on a big data storage platform. After receiving the reported records, the big data platform calculates start and end identifiers of a video highlight segment according to a behavior meaning represented by each reported action and action time distribution. The solution can achieve at least the following effects:

(1) Without depending on manual selection of a to-be-annotated target segment, a video segment is automatically selected and annotated by a server, resulting in high annotation efficiency.

(2) Judgment on a degree of excitement or a possibility of creating a trend by a video segment depends entirely on big data of user behavior, resulting in a very high match with actual interest of users.

(3) Unlike manual annotation tending to be a one-time job (for labor, cost, and other reasons, annotation basically remains unchanged once completed), making it difficult to adapt to a dynamic case of hotspot changing in a video play process, in the technical solution of this embodiment of this application, a target segment can be calculated in real time, to display the target segment in real time as a hotspot. Alternatively, a target segment may be periodically calculated according to a part or all of historical user behavior data to update the previously calculated hotspot segment.

Figure 5:
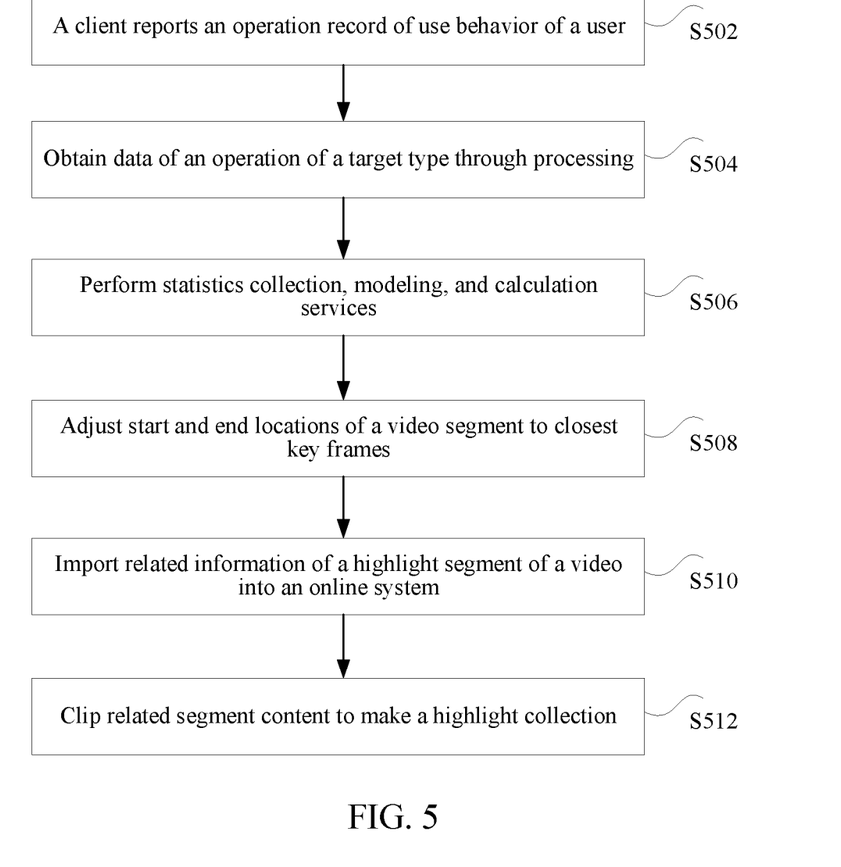
FIG. 5 is a flowchart of another video highlight determination method according to an embodiment of this application.

This application further provides an exemplary embodiment. The exemplary embodiment is described in detail by using highlight collection making shown in FIG. 5 as an example:

Step S502. A user behavior data collection logic is embedded in a front end client, and the client reports an operation record of use behavior of a user.

Step S504. A database imports data reported by the client front end onto a big data platform, so that the data is transformed and filtered to obtain data of an operation of a target type for a subsequent calculation service.

Step S506. Perform statistics collection, modeling, and calculation services, including: classifying and summarizing, according to a granularity of a VID, all report records related to VIDs; obtaining categories through classification based on timing of the report records of the VIDs by using a density-based clustering algorithm, and finding a region in which an highlight segment is located; then finding, by using a normal distribution method, an intermediate position of the region as a separation point for a segment edge; and obtaining start and end locations of each highlight segment with reference to interval distribution of a cluster and a relationship between separation points.

Step S508. As a compression technology is used for the video, the start and end locations obtained in the previous step may not directly correspond to a clear and complete picture. For better video quality, the start and end locations of the segment may be further optimized by adjusting the start and end locations of the video segment to key frames closest to the start and end locations, as final edge locations of the segment.

Step S510. After obtaining the start and end locations of the segment, a system may import related information of the highlight segment of the video into an online system for use in service scenarios.

Step S512. Directly clip related segment content to make a highlight collection for direct sharing and propagation.

In the solution of this embodiment of this application, big data statistics and data mining technologies are introduced, a machine automatically discovers and identifies exciting content of a video based on common active behavior of users, which reduces dependence on editorial and operational experience. Fully automatic running of the machine replaces existing manual processing, which reduces costs and improves processing efficiency.

The foregoing method embodiments are expressed as a series of action combinations for the purpose of brief description, but it is to be understood by a person skilled in the art that because some steps may be performed in other sequences or simultaneously according to the embodiments of this application, the embodiments of this application are not limited to a described action sequence. In addition, it is to be understood by a person skilled in the art that the embodiments described in this specification are all exemplary embodiments; and therefore, an action and a module involved are not necessarily mandatory in the embodiments of this application.

Through the foregoing description of the implementations, it is clear to a person skilled in the art that the methods in the foregoing embodiments may be implemented by software plus a necessary universal hardware platform, and certainly may also be implemented by hardware, but in many cases, the software implementation is exemplary. Based on such an understanding, the technical solutions of the embodiments of this application essentially or the part contributing to the related art may be implemented in a form of a software product. The computer software product is stored in a storage medium (such as a read-only memory (ROM)/random access memory (RAM), a magnetic disk, or an optical disc) and includes several instructions for instructing a terminal device (which may be a mobile phone, a computer, a server, a network device, or the like) to perform the methods described in the embodiments of this application.

Figure 6:
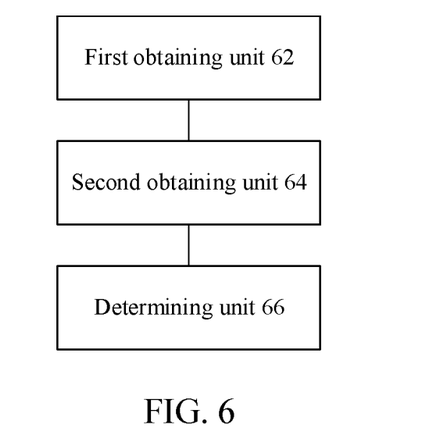
FIG. 6 is a schematic diagram of a video highlight determination apparatus according to an embodiment of this application.

According to another aspect of the embodiments of this application, a video highlight determination apparatus for implementing the foregoing video highlight determination method is further provided. FIG. 6 is a schematic diagram of an optional video highlight determination apparatus according to an embodiment of this application. As shown in FIG. 6, the apparatus may include one or more processors and one or more memories storing program units. The program units are executed by the processors, and include: a first obtaining unit 62, a second obtaining unit 64, and a determining unit 66.

The first obtaining unit 62 is configured to obtain operation records of a target video, each operation record being used for indicating a first play moment and an operation performed on the target video at the first play moment, and the first play moment being a play moment of the target video.

The operation record may include two information parts. One is an operation action (for example, posting a bullet comment, a chat operation, participating in interaction, skipping during watching, or taking a video screenshot). The other is related information (namely, streaming information, including information such as a user ID, a play moment of the video during operation, an operation type, and operation content) of the operation action. At least the play moment of the video during operation and the operation type are included.

The second obtaining unit 64 is configured to obtain, from the operation records, a quantity of operations of a target type that are performed on the target video at each play moment of the target video.

An operation of the target type may be determined according to a type of a target segment needing to be determined. For example, if the target segment needing to be determined is a hotspot video segment, the operation of the target type is a hotspot-related operation, such as posting a bullet comment, a chat operation, participating in interaction, or taking a video screenshot. For another example, if the target segment needing to be determined is a completely played segment, the operation of the target type is a complete-play-related operation, such as a fast forward operation, a rewind operation, or a drag operation on a play progress bar. Alternatively, the target segment needing to be determined may be a highlight segment, a key segment, or the like.

The determining unit 66 is configured to determine a target segment in the target video according to the quantity, a ratio of a total quantity of operations of the target type that are performed on the target video during the target segment to a duration of the target segment being at least greater than a ratio of a total quantity of operations of the target type that are performed on the target video to a duration of the target video.

In the foregoing steps, big data analysis may be performed on corresponding user behavior (namely, operations indicated in the operation records) according to a need (namely, a type of the target segment), to obtain behavior data of users at each play moment of the entire target video, to determine a desired target segment (namely, a coherent video segment receiving relatively dense operations) according to the behavior data of the users.

The first obtaining unit 62 in this embodiment may be configured to perform step S202 in the foregoing embodiment of this application, the second obtaining unit 64 in this embodiment may be configured to perform step S204 in the foregoing embodiment of this application, and the determining unit 66 in this embodiment may be configured to perform step S206 in the foregoing embodiment of this application.

Implementation examples and application scenarios of the foregoing modules are the same as those of the corresponding steps, but are not limited to the content disclosed in the foregoing embodiment. The foregoing module, as a part of the apparatus, may run in the hardware environment shown in FIG. 1, and may be implemented by using software, or may be implemented by using hardware.

With the foregoing modules, a quantity of operations of a target type that are performed on a target video at each play moment of the target video is obtained from obtained operation records; and a desired target segment is determined in the target video according to a principle of a ratio of a total quantity of operations of the target type that are performed on the target video during the target segment to a duration of the target segment being at least greater than a ratio of a total quantity of operations of the target type that are performed on the target video to a duration of the target video. This embodiment of this application can resolve a technical problem of low efficiency in determining a desired video segment in a video in the related art, and improve the efficiency in determining a desired target segment in a target video.

Figure 7:
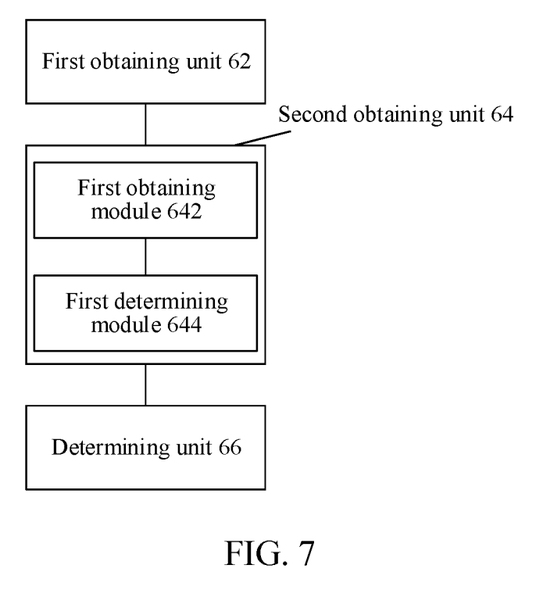
FIG. 7 is a schematic diagram of another video highlight determination apparatus according to an embodiment of this application.

In some embodiments, as shown in FIG. 7, the second obtaining unit includes: a first obtaining module 642, configured to obtain a first operation record from the plurality of operation records, where the first operation record is used for indicating an operation of the target type that is performed on the target video at the first play moment; and a first determining module 644, configured to determine, according to the first play moment recorded in all first operation records, the quantity of the operations of the target type that are performed on the target video at each play moment of the target video.

The first obtaining module obtains one of the plurality of operation records; and uses the obtained operation record as the first operation record when an operation identifier recorded in the obtained operation record is used for indicating an operation of the target type.

In some embodiments, the determining unit includes: a second obtaining module, configured to obtain an operation density of a target play period in the target video, where the target play period is any play period that is in the target video and whose play duration is a first threshold, and the operation density is a ratio of a total quantity of operations of the target type that are performed within the target play period to the first threshold; and a second determining module, configured to determine a video segment in which the target play period is located as the target segment when the operation density of the target play period is greater than a second threshold, where the second threshold is greater than or equal to the ratio of the total quantity of the operations of the target type that are performed on the target video to the duration of the target video.

The second obtaining module is further configured to obtain operation densities of a plurality of target play periods in the target video, where start play moments of two adjacent target play periods are spaced by a time unit.

The second determining module is further configured to set, when there are a plurality of target play periods, all the target play periods in a to-be-processed state, and perform the following operations on the target play periods until all the target play periods are in a processed state: using a currently processed target play period as a first play period; combining, when a target play period overlaps the first play period, the target play period overlapping the first play period and the first play period into a second play period, and using the second play period as the target play period in a to-be-processed state; combining, when a time interval between the first play period and an adjacent target play period is less than a third threshold, the first play period, the adjacent target play period, and the time interval into a third play period, and using the third play period as the target play period in a to-be-processed state; and setting the first play period to be the target play period in a processed state when the time interval between the first play period and the adjacent target play period is not less than the third threshold, and using a video segment in which the target play period in a processed state is located as the target segment.

In some embodiments, after determining the video segment in which the target play period is located as the target segment, the determining unit is further configured to revise the target segment in the following steps: using, when a video frame in which a start play moment of the target segment is located is not a key frame, a first play moment of a key frame closest to the start play moment of the target segment as a start play moment of the target segment; and using, when a video frame in which an end play moment of the target segment is located is not a key frame, a second play moment of a key frame closest to the end play moment of the target segment as an end play moment of the target segment.

The first play moment is earlier than the start play moment of the target segment before the revision; and the second play moment is later than the end play moment of the target segment before the revision.

In some embodiments, after determining the target segment in the target video according to the quantity, the determining unit is further configured to perform at least one of the following: transmitting instruction information to a terminal when the terminal plays the target video, where the instruction information is used for instructing the terminal to identify the target segment; transmitting the instruction information to the terminal in response to a received request to play the target video; and combining, when there are a plurality of the target segments, the plurality of the target segments into one video.

In the solution of this embodiment of this application, the server automatically performs clipping, which replaces manual processing in the related art. When receiving a content medium to be put online, a video editor does not need to annotate or record a video hotspot segment, but only completes video review and release. After content release, a video play terminal (for example, a video client such as an Android mobile phone, an iPhone mobile phone, a PC, a WEB, or a TV) identifies, extracts, and reports streaming information (including information fields such as a user ID, an operation time, an operation type, and operation content) of a video watching action (such as posting a bullet comment, participating in interaction, skipping during watching, or taking a video screenshot) of a user. After receiving the reported information (operation records), the back end imports the information on a big data storage platform. After receiving the reported records, the big data platform calculates start and end identifiers of a video highlight segment according to a behavior meaning represented by each reported action and action time distribution. The solution can achieve at least the following effects:

(1) Without depending on manual selection of a to-be-annotated target segment, a video highlight is automatically selected and annotated by a server, resulting in high annotation efficiency.

(2) Judgment on a degree of excitement or a possibility of creating a trendy by a video segment depends entirely on big data of user behavior, resulting in a very high match with actual interest of users.

(3) Unlike manual annotation tending to be a one-time job (for labor, cost, and other reasons, annotation basically remains unchanged once completed), making it difficult to adapt to a dynamic case of hotspot changing in a video play process, in the technical solution of this embodiment of this application, a target segment can be calculated in real time, to display the target segment in real time as a hotspot. Alternatively, a target segment may be periodically calculated according to a part or all of historical user behavior data to update the previously calculated hotspot segment.

Implementation examples and application scenarios of the foregoing modules are the same as those of the corresponding steps, but are not limited to the content disclosed in the foregoing embodiment. The foregoing module, as a part of the apparatus, may run in the hardware environment shown in FIG. 1, and may be implemented by using software, or may be implemented by using hardware. The hardware environment includes a network environment.

According to another aspect of the embodiments of this application, an electronic device for implementing the foregoing video highlight determination method is further provided. The electronic device may be a server or a terminal.

Figure 8:
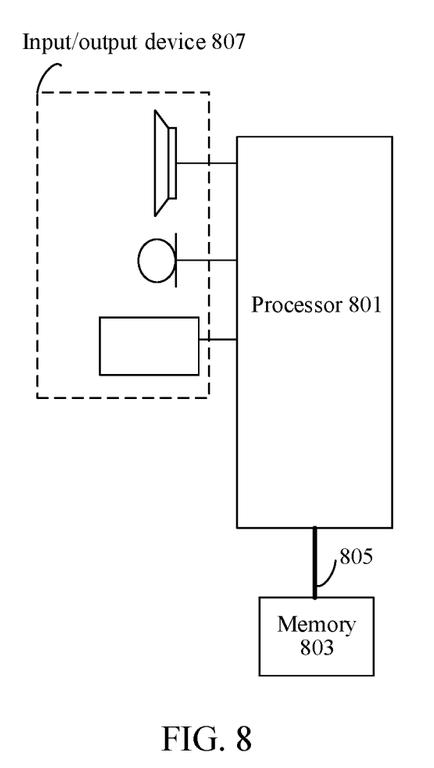
FIG. 8 is a structural block diagram of an electronic device according to an embodiment of this application.

FIG. 8 is a structural block diagram of an electronic device according to an embodiment of this application. The following description is provided by using an example that the electronic device is a terminal. As shown in FIG. 8, the terminal may include: one or more processors 801 (only one is shown in FIG. 8), a memory 803, and a transmission apparatus 805. As shown in FIG. 8, the terminal may further include an input/output device 807.

The memory 803 may be configured to store a software program and module, for example, a program instruction/module corresponding to the video highlight determination method and apparatus in the embodiments of this application. The processor 801 performs various functional applications and data processing by running the software program and module stored in the memory 803, that is, implementing the video highlight determination method. The memory 803 may include a high speed random access memory, and may further include a non-volatile memory, for example, one or more magnetic storage apparatuses, a flash memory, or another non-volatile solid-state memory. In some examples, the memory 803 may further include a memory disposed remote to the processor 801, and the remote memory may be connected to the terminal through a network. Examples of the network include but are not limited to the Internet, an intranet, a local area network, a mobile communications network, and a combination thereof.

The transmission apparatus 805 is configured to receive or send data through a network, and may further be configured to transmit data between the processor and the memory. Specific examples of the network include a wired network and a wireless network. In an example, the transmission apparatus 805 includes a network interface controller (NIC), which may be connected to another network device and a router by using a cable, to communicate with the Internet or a local area network. In an example, the transmission apparatus 805 is a radio frequency (RF) module, which communicates with the Internet through a wireless connection.

Specifically, the memory 803 is configured to store an application program.

The processor 801 may invoke, by using the transmission apparatus 805, the application program stored in the memory 803, to perform the following steps: obtaining operation records of a target video, each operation record being used for indicating a first play moment and an operation performed on the target video at the first play moment, and the first play moment being a play moment of the target video; obtaining, from the operation records, a quantity of operations of a target type that are performed on the target video at each play moment of the target video; and determining a target segment in the target video according to the quantity, a ratio of a total quantity of operations of the target type that are performed on the target video during the target segment to a duration of the target segment being at least greater than a ratio of a total quantity of operations of the target type that are performed on the target video to a duration of the target video.

The processor 801 is further configured to perform the following steps: using a currently processed target play period as a first play period; combining, when a target play period overlaps the first play period, the target play period overlapping the first play period and the first play period into a second play period, and using the second play period as the target play period in a to-be-processed state; combining, when a time interval between the first play period and an adjacent target play period is less than a third threshold, the first play period, the adjacent target play period, and the time interval into a third play period, and using the third play period as the target play period in a to-be-processed state; and setting the first play period to be the target play period in a processed state when the time interval between the first play period and the adjacent target play period is not less than the third threshold, and using a video segment in which the target play period in a processed state is located as the target segment.

Through this embodiment of this application, a quantity of operations of a target type that are performed on a target video at each play moment of the target video is obtained from obtained operation records; and a desired target segment is determined in the target video according to a principle of a ratio of a total quantity of operations of the target type that are performed on the target video during the target segment to a duration of the target segment being at least greater than a ratio of a total quantity of operations of the target type that are performed on the target video to a duration of the target video. This embodiment of this application can resolve a technical problem of low efficiency in determining a desired video segment in a video in the related art, and improve the efficiency in determining a desired target segment in a target video.

In some embodiments, for a specific example in this embodiment, reference may be made to the examples described in the foregoing embodiments, and details are not described again in this embodiment.

A person of ordinary skill in the art may understand that the structure shown in FIG. 8 is merely an example, and the terminal may be a terminal device such as a smartphone (for example, an Android mobile phone or an iOS mobile phone), a tablet computer, a palmtop computer, a mobile Internet device (MID), and a PAD. FIG. 8 does not limit the structure of the electronic device. For example, the terminal may further include more or fewer components (for example, a network interface and a display apparatus) than those shown in FIG. 8, or have configuration different with that shown in FIG. 8.

A person of ordinary skill in the art may understand that all or some of the steps of the methods in the embodiments may be implemented by a program by instructing hardware relevant to a terminal device. The program may be stored in a computer-readable storage medium, and the storage medium may be a flash drive, a ROM, a RAM, a magnetic disk, an optical disc, and the like.

An embodiment of this application further provides a storage medium. In some embodiments, in this embodiment, the storage medium may be configured to store program code for performing a video highlight determination method.

In some embodiments, in this embodiment, the storage medium may be located on at least one of a plurality of network devices on the network shown in the foregoing embodiment.

In some embodiments, in this embodiment, the storage medium is configured to store program code for performing the following steps:

Obtain operation records of a target video, each operation record being used for indicating a first play moment and an operation performed on the target video at the first play moment, and the first play moment being a play moment of the target video.

Obtain, from the operation records, a quantity of operations of a target type that are performed on the target video at each play moment of the target video.

Determine a target segment in the target video according to the quantity, a ratio of a total quantity of operations of the target type that are performed on the target video during the target segment to a duration of the target segment being at least greater than a ratio of a total quantity of operations of the target type that are performed on the target video to a duration of the target video.

In some embodiments, the storage medium is further configured to store program code for performing the following steps:

Use a currently processed target play period as a first play period.

Combine, when a target play period overlaps the first play period, the target play period overlapping the first play period and the first play period into a second play period, and use the second play period as the target play period in a to-be-processed state.

Combine, when a time interval between the first play period and an adjacent target play period is less than a third threshold, the first play period, the adjacent target play period, and the time interval into a third play period, and use the third play period as the target play period in a to-be-processed state.

Set the first play period to be the target play period in a processed state when the time interval between the first play period and the adjacent target play period is not less than the third threshold, and use a video segment in which the target play period in a processed state is located as the target segment.

In some embodiments, for a specific example in this embodiment, reference may be made to the examples described in the foregoing embodiments, and details are not described again in this embodiment.

In some embodiments, in this embodiment, the storage medium may include but is not limited to: any medium that can store program code, such as a USB flash drive, a ROM, a RAM, a removable hard disk, a magnetic disk, or an optical disc.

The sequence numbers of the foregoing embodiments of this application are merely for illustrative purposes, and are not intended to indicate priorities of the embodiments.

When the integrated unit in the foregoing embodiments is implemented in the form of a software functional unit and sold or used as an independent product, the integrated unit may be stored in the foregoing computer-readable storage medium. Based on such understanding, the technical solutions of the embodiments of this application essentially, or some contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, the description of each embodiment has respective focuses. For a part that is not described in detail in an embodiment, refer to related descriptions in other embodiments.

In the several embodiments provided in the present application, the disclosed client may be implemented in another manner. For example, the described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software function unit.

The above descriptions are merely exemplary embodiments of this application, and a person of ordinary skill in the art may make various improvements and modifications without departing from the spirit of the embodiments of this application. All such modifications improvements and modifications are to be construed as falling within the protection scope of the embodiments of this application.

Through the embodiments of this application, a quantity of operations of a target type that are performed on a target video at each play moment of the target video is obtained from obtained operation records; and a desired target segment is determined in the target video according to a principle of a ratio of a total quantity of operations of the target type that are performed on the target video during the target segment to a duration of the target segment being at least greater than a ratio of a total quantity of operations of the target type that are performed on the target video to a duration of the target video. The embodiments of this application can resolve a technical problem of low efficiency in determining a desired video segment in a video in the related art, and improve the efficiency in determining a desired target segment in a target video.

What is claimed is:

1. A video highlight determination method, comprising:
obtaining operation records of a target video from instances of the target video, each operation record indicating a play moment of the target video and an operation performed on the target video at the play moment;
obtaining, from the operation records, a quantity of operations of a target type performed on the target video at each play moment of the target video;
determining a plurality of play periods in the target video, each play period including a same fixed number N of time units, and each pair of adjacent play periods are spaced by one time unit and overlapped by (N−1) time units, N being an integer greater than 1;
obtaining an operation density of each play period in the target video, wherein the operation density of a play period is a ratio of a total quantity of operations of the target type that are performed during the play period to a duration of the play period;
determining a play period as a target play period when the operation density of the play period is greater than a density threshold, wherein the density threshold is greater than a ratio of a total quantity of operations of the target type that are performed on the target video to a duration of the target video; and
determining a video segment corresponding to the target play period as the target segment, including: setting, when there are a plurality of target play periods whose operation densities are greater than the density threshold, all the target play periods in a to-be-processed state, and performing the following operations on the target play periods until all the target play periods are in a processed state:
using a currently processed target play period as a first play period;
when a target play period overlaps the first play period, combining the target play period overlapping the first play period and the first play period into a second play period, and identifying the second play period as a target play period in the to-be-processed state;

when a time interval between the first play period and an adjacent target play period not overlapping with the first play period is less than a duration threshold, combining the first play period, the adjacent target play period, and the time interval into a third play period, and identifying the third play period as a target play period in the to-be-processed state; and setting the first play period to the processed state when the time interval between the first play period and the adjacent target play period is not less than the duration threshold and no target play period overlaps the first play period, and identifying a video segment of the first play period in the processed state as the target segment.

2. The method according to claim 1, wherein the obtaining, from the operation records, a quantity of operations of a target type that are performed on the target video at each play moment of the target video comprises:

obtaining a target operation record from each of the operation records, wherein the target operation record indicating an operation of the target type that is performed on the target video at a corresponding play moment; and determining, according to play moments recorded in all target operation records, the quantity of the operations of the target type that are performed on the target video at each play moment of the target video.

3. The method according to claim 2, wherein the obtaining a target operation record from each of the operation records comprises:

obtaining one of the plurality of operation records; and identifying the obtained operation record as the target operation record when an operation identifier recorded in the obtained operation record indicating an operation of the target type.

4. The method according to claim 1, wherein the first play moment is earlier than the start play moment of the target segment before the start play moment is revised; and the second play moment is later than the end play moment of the target segment before the end play moment is revised.

5. The method according to claim 1, wherein the obtaining an operation density of each play period in the target video comprises:

obtaining operation densities of the plurality of play periods in the target video, wherein start play moments of two adjacent play periods are spaced by a time unit.

6. The method according to claim 1, wherein after the determining a segment in the target video as a target segment, the method further comprises at least one of the following:

transmitting instruction information to a terminal when the terminal plays the target video, the instruction information instructing the terminal to identify the target segment;

transmitting the instruction information to the terminal in response to a received request to play the target video; and combining, when there are a plurality of the target segments, the plurality of the target segments into one video.

7. The method according to claim 1, after determining the target segment, further comprising:

determining whether a video frame at a start play moment of the target segment is a key frame and determining whether a video frame at an end play moment of the target segment is a key frame;

when determining that the video frame at the start play moment of the target segment is not a key frame, revising the start play moment of the target segment to be a first play moment of a key frame closest to the start play moment of the target segment; and when determining that the video frame at the end play moment of the target segment is not a key frame, revising the end play moment of the target segment to be a second play moment of a key frame closest to the end play moment of the target segment.

8. A video highlight determination apparatus, comprising one or more processors and one or more memories coupled to the one or more processors, the one or more processors are configured to:

obtain operation records of a target video, each operation record indicating a play moment of the target video and an operation performed on the target video at the play moment;

obtain, from the operation records, a quantity of operations of a target type that are performed on the target video at each play moment of the target video;

determine a plurality of play periods in the target video, each play period including a same fixed number N of time units, and each pair of adjacent play periods are spaced by one time unit and overlapped by (N−1) time units, N being an integer greater than 1;

obtain an operation density of each play period in the target video, wherein the operation density of a play period is a ratio of a total quantity of operations of the target type that are performed during the play period to a duration of the play period;

determine a play period as a target play period when the operation density of the play period is greater than a density threshold, wherein the density threshold is greater than a ratio of a total quantity of operations of the target type that are performed on the target video to a duration of the target video; and determine a video segment corresponding to the target play period as the target segment, including: setting, when there are a plurality of target play periods whose operation densities are greater than the density threshold, all the target play periods in a to-be-processed state, and performing the following operations on the target play periods until all the target play periods are in a processed state:

using a currently processed target play period as a first play period;

when a target play period overlaps the first play period, combining the target play period overlapping the first play period and the first play period into a second play period, and identifying the second play period as a target play period in the to-be-processed state;

when a time interval between the first play period and an adjacent target play period not overlapping with the first play period is less than a duration threshold, combining the first play period, the adjacent target play period, and the time interval into a third play period, and identifying the third play period as a target play period in the to-be-processed state; and setting the first play period to the processed state when the time interval between the first play period and the adjacent target play period is not less than the duration threshold and no target play period overlaps the first play period, and identifying a video segment of the first play period in the processed state as the target segment.

9. The apparatus according to claim 8, wherein the one or more processors are further configured to:
  obtain a target operation record from the operation records, the target operation record indicating an operation of the target type that is performed on the target video at a corresponding play moment; and
  determine, according to play moments recorded in all target operation records, the quantity of the operations of the target type that are performed on the target video at each play moment of the target video.

10. The apparatus according to claim 8, wherein the one or more processors are further configured to:
  determine whether a video frame at a start play moment of the target segment is a key frame and determining whether a video frame at an end play moment of the target segment is a key frame;
  when determining that the video frame at the start play moment of the target segment is not a key frame, revise the start play moment of the target segment to be a first play moment of a key frame closest to the start play moment of the target segment; and
  when determining that the video frame at the end play moment of the target segment is not a key frame, revise the end play moment of the target segment to be a second play moment of a key frame closest to the end play moment of the target segment.

11. The apparatus according to claim 10, wherein: the key frame is a frame in which a key action when a character or an object of the target video moves or changes occurs.

12. A non-transitory computer readable storage medium storing a program, the program, when executed by one or more processors, causing the one or more processors to perform:
  obtaining operation records of a target video from instances of the target video, each operation record indicating a play moment of the target video and an operation performed on the target video at the play moment;
  obtaining, from the operation records, a quantity of operations of a target type performed on the target video at each play moment of the target video;
  determining a plurality of play periods in the target video, each play period including a same fixed number N of time units, and each pair of adjacent play periods are spaced by one time unit and overlapped by (N−1) time units, N being an integer greater than 1;
  obtaining an operation density of each play period in the target video, wherein the operation density of a play period is a ratio of a total quantity of operations of the target type that are performed during the play period to a duration of the play period;
  determining a play period as a target play period when the operation density of the play period is greater than a density threshold, wherein the density threshold is greater than a ratio of a total quantity of operations of the target type that are performed on the target video to a duration of the target video; and
  determining a video segment corresponding to the target play period as the target segment, including: setting, when there are a plurality of target play periods whose operation densities are greater than the density threshold, all the target play periods in a to-be-processed state, and performing the following operations on the target play periods until all the target play periods are in a processed state:
    using a currently processed target play period as a first play period;
    when a target play period overlaps the first play period, combining the target play period overlapping the first play period and the first play period into a second play period, and identifying the second play period as a target play period in the to-be-processed state;
    when a time interval between the first play period and an adjacent target play period not overlapping with the first play period is less than a duration threshold, combining the first play period, the adjacent target play period, and the time interval into a third play period, and identifying the third play period as a target play period in the to-be-processed state; and
    setting the first play period to the processed state when the time interval between the first play period and the adjacent target play period is not less than the duration threshold and no target play period overlaps the first play period, and identifying a video segment of the first play period in the processed state as the target segment.

13. The storage medium according to claim 12, wherein the obtaining, from the operation records, a quantity of operations of a target type that are performed on the target video at each play moment of the target video comprises:
  obtaining a target operation record from each of the operation records, wherein the target operation record indicating an operation of the target type that is performed on the target video at a corresponding play moment; and
  determining, according to play moments recorded in all target operation records, the quantity of the operations of the target type that are performed on the target video at each play moment of the target video.

14. The storage medium according to claim 13, wherein the obtaining a target operation record from each of the operation records comprises:
  obtaining one of the plurality of operation records; and
  identifying the obtained operation record as the target operation record when an operation identifier recorded in the obtained operation record indicating an operation of the target type.

15. The storage medium according to claim 12, wherein the first play moment is earlier than the start play moment of the target segment before the start play moment is revised; and the second play moment is later than the end play moment of the target segment before the end play moment is revised.

16. The storage medium according to claim 12, wherein the obtaining an operation density of each play period in the target video comprises:
  obtaining operation densities of the plurality of play periods in the target video, wherein start play moments of two adjacent play periods are spaced by a time unit.

17. The storage medium according to claim 12, wherein after determining the target segment, the program further cause the one or more processors to perform:
  determining whether a video frame at a start play moment of the target segment is a key frame and determining whether a video frame at an end play moment of the target segment is a key frame;
  when determining that the video frame at the start play moment of the target segment is not a key frame, revising the start play moment of the target segment to be a first play moment of a key frame closest to the start play moment of the target segment; and
  when determining that the video frame at the end play moment of the target segment is not a key frame, revising the end play moment of the target segment to be a second play moment of a key frame closest to the end play moment of the target segment.

\* \* \* \* \*